(12) United States Patent
Tanaka et al.

(10) Patent No.: US 10,695,834 B2
(45) Date of Patent: Jun. 30, 2020

(54) MATERIAL FEEDER OF ADDITIVE MANUFACTURING APPARATUS, ADDITIVE MANUFACTURING APPARATUS, AND ADDITIVE MANUFACTURING METHOD

(71) Applicant: KABUSHIKI KAISHA TOSHIBA, Minato-ku (JP)

(72) Inventors: Masayuki Tanaka, Yokohama (JP); Hiroshi Ohno, Yokohama (JP); Takahiro Terada, Yokohama (JP); Kaori Deura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 855 days.

(21) Appl. No.: 15/124,270

(22) PCT Filed: Sep. 10, 2014

(86) PCT No.: PCT/JP2014/073982
§ 371 (c)(1),
(2) Date: Sep. 7, 2016

(87) PCT Pub. No.: WO2015/145812
PCT Pub. Date: Oct. 1, 2015

(65) Prior Publication Data
US 2017/0014902 A1    Jan. 19, 2017

(30) Foreign Application Priority Data

Mar. 24, 2014    (JP) .................................. 2014-060395

(51) Int. Cl.
*B22F 3/105*    (2006.01)
*B33Y 30/00*    (2015.01)
(Continued)

(52) U.S. Cl.
CPC ............ *B22F 3/1055* (2013.01); *B22F 3/004* (2013.01); *B29C 64/153* (2017.08);
(Continued)

(58) Field of Classification Search
CPC ................... B22F 3/1055; B22F 3/004; B22F 2003/1056; B29C 70/386; B29C 64/153; B33Y 30/00; Y02P 10/295
See application file for complete search history.

(56) References Cited

U.S. PATENT DOCUMENTS 5,902,537 A  *  5/1999  Almquist ............... B33Y 30/00
                                                      264/401
8,226,394 B2 *  7/2012  Honda ................... B33Y 40/00
                                                      425/174.4
(Continued)

FOREIGN PATENT DOCUMENTS

JP        10-264134 A      10/1998
JP      2001-158520 A       6/2001
(Continued)

OTHER PUBLICATIONS

International Search Report dated Nov. 18, 2014, in PCT/JP2014/073982 filed Sep. 10, 2014.
(Continued)

*Primary Examiner* — Nahida Sultana
(74) *Attorney, Agent, or Firm* — Oblon, McClelland, Maier & Neustadt, L.L.P.

(57) ABSTRACT

According to one embodiment, a material feeder includes a feeding unit. The feeding unit includes a container that is containable of a powdery material and a first wall that is provided with a plurality of first openings communicated with the container and at least partially covers a region to which the material is fed, the feeding unit feeding the
(Continued)

material in the container from the first openings to the region to form a layer of the material.

7 Claims, 13 Drawing Sheets

(51) Int. Cl.
    *B33Y 10/00*     (2015.01)
    *B29C 70/38*     (2006.01)
    *B22F 3/00*     (2006.01)
    *B29C 64/153*     (2017.01)

(52) U.S. Cl.
    CPC .......... *B29C 70/386* (2013.01); *B33Y 30/00* (2014.12); *B22F 2003/1056* (2013.01); *Y02P 10/295* (2015.11)

(56) References Cited

U.S. PATENT DOCUMENTS

| | | | | |
|---|---|---|---|---|
| 9,943,906 | B2* | 4/2018 | Umeda | B22F 3/004 |
| 10,259,072 | B2* | 4/2019 | Holcomb | B22F 3/1017 |
| 10,335,901 | B2* | 7/2019 | Ferrar | B22F 3/1055 |
| 10,399,145 | B2* | 9/2019 | McMurtry | B29C 64/153 |
| 2001/0045678 | A1 | 11/2001 | Kubo et al. | |
| 2002/0105114 | A1 | 8/2002 | Kubo et al. | |
| 2009/0025638 | A1 | 1/2009 | Inoue | |
| 2013/0337100 | A1* | 12/2013 | Costabeber | B29C 64/386 425/174 |
| 2015/0183166 | A1* | 7/2015 | Yoo | B33Y 40/00 264/128 |
| 2015/0231831 | A1* | 8/2015 | El-Siblani | B29C 64/20 264/401 |
| 2015/0290710 | A1* | 10/2015 | Ackelid | B22F 1/0085 419/30 |
| 2018/0369917 | A1* | 12/2018 | Mottin | B22F 3/1055 |

FOREIGN PATENT DOCUMENTS

| | | |
|---|---|---|
| JP | 2001-334583 A | 12/2001 |
| JP | 2002-307562 A | 10/2002 |
| JP | 2007-216595 A | 8/2007 |
| JP | 4450304 B2 | 2/2010 |
| WO | WO 2007/013240 A1 | 2/2007 |

OTHER PUBLICATIONS

Notice of Rejection dated Dec. 8, 2015, in Japan Application No. 2014-060395 filed Mar. 24, 2014.

* cited by examiner

MATERIAL FEEDER OF ADDITIVE MANUFACTURING APPARATUS, ADDITIVE MANUFACTURING APPARATUS, AND ADDITIVE MANUFACTURING METHOD

CROSS-REFERENCE TO RELATED APPLICATIONS

This application is national stage application of International Application No. PCT/JP2014/073982, filed Sep. 10, 2014, which designates the United States, incorporated herein by reference, and which is based upon and claims the benefit of priority from Japanese Patent Application No. 2014-060395, filed Mar. 24, 2014, the entire contents of which are incorporated herein by reference.

FIELD

Embodiments described herein relate generally to material feeders of additive manufacturing apparatuses, additive manufacturing apparatuses, and additive manufacturing methods.

BACKGROUND

There are known additive manufacturing apparatuses, such as three-dimensional printers. These three-dimensional printers form layers of a powdery material and solidify such a material for each layer of the material with binders (bonding agents) or laser beams to form three-dimensional shapes.

CITATION LIST

Patent Literature

Patent Literature 1: Japanese Patent Application Laid-open No. 2007-216595

DETAILED DESCRIPTION

According to one embodiment, a material feeder includes a feeding unit. The feeding unit includes a container that is containable of a powdery material and a first wall that is provided with a plurality of first openings communicated with the container and at least partially covers a region to which the material is fed, the feeding unit feeding the material in the container from the first openings to the region to form a layer of the material.

Hereinafter, a first embodiment will be described with reference to FIGS. 1 to 5. In the present specification, a vertical upside is referred to as an upper direction and a vertical downside is referred to as a lower direction. A plural expression may be written together for a component according to embodiments and the description thereof. It is not precluded that other expressions that are not described are made for the component and description. Furthermore, it is not precluded that other expressions are made for the component and description that is not described about its plural expression.

Figure 1:
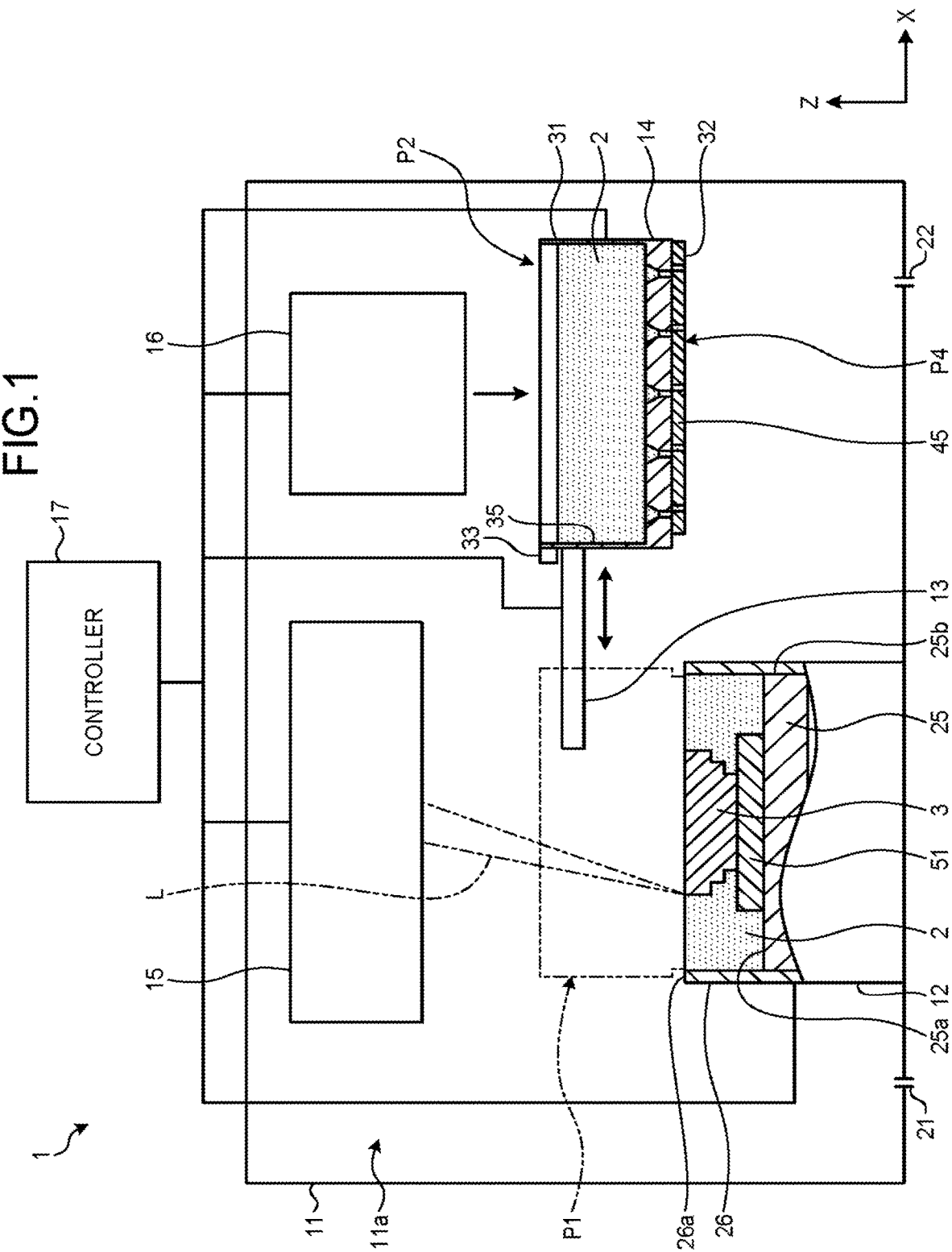
FIG. 1 is a schematic view of a three-dimensional printer according to a first embodiment.

FIG. 1 is a schematic view of a three-dimensional printer 1. The three-dimension al printer 1 is an example of an additive manufacturing apparatus. Such an additive manufacturing apparatus may be other apparatuses other than three-dimensional printers. The three-dimensional printer 1 repeats the formation of a layer of a powdery material 2 and the solidification of the layer of the material. 2 to form a three-dimensionally shaped manufactured object 3. FIG. 1 illustrates the manufactured object 3 during the formation. In the present embodiment, the material 2 is a powdery metal material having a central particle size of approximately 40 µm. The material 2 is not limited to this example.

As illustrated in FIG. 1, the three-dimensional printer 1 includes a treatment tank 11, a stage 12, a moving device 13, a material feeder 14, an optical device 15, a material replenishing device 16, and a controller 17. The treatment tank 11 may be referred to as a casing, for example. The stage 12 may be referred to as a platform, an object formation region, or an application region, for example. The moving device 13 is an example of a moving unit and may be also referred to as a conveying unit, or an evacuating unit, for example. The material feeder 14 is an example of a feeding unit and may be also referred to as a holding unit, a releasing unit, or a dispersing unit, for example. The optical device 15 is an example of a forming unit and may be also referred to as a shaping unit, a solidifying unit, or a coupling unit, for example. The material replenishing device 16 is an example of a replenishing unit and may be also referred to as a feeding unit, or a filling unit, for example.

As illustrated in the drawings, an X-axis, a Y-axis, and a Z-axis are defined in the present specification. The X-axis, the Y-axis, and the Z-axis are orthogonal to each other. In the present specification, an X-axis direction, a Y-axis direction, and a Z-axis direction are respectively assumed as a width direction, a depth (length) direction, and a height direction of the material feeder 14.

The treatment, tank 11 is formed into an enclosable box shape, for example. The treatment tank 11 has a treatment chamber 11a. The stage 12, the moving device 13, the material feeder 14, the optical device 15, and the material replenishing device 16 are contained in the treatment chamber 11a. The stage 12, the moving device 13, the material feeder 14, the optical device 15, and the material replenishing device 16 may be outside the treatment chamber 11a.

The treatment chamber 11a of the treatment tank 11 is provided with a supply port 21 and a discharge port 22. For example, a supplying device outside the treatment tank 11 supplies an inert gas, such as nitrogen and argon, through the supply port. 21 to the treatment chamber 11a. For example, a discharging device outside the treatment tank 11 discharges the inert gas in the treatment chamber 11a through the discharge port 22.

The stage 12 has a platform 25 and a circumferential wall 26. The platform 25 is a square plate-like shaped member, for example. The shape of the platform 25 is not limited to this example, and may foe a member having other shapes including another quadrangle (quadrilateral) including a rectangle, a polygon, a circle, and a geometry shape. The platform 25 has an upper face 25a and four end faces 25b. The upper face 25a is a quadrangular flat surface of 250 mm×250 mm. The size of the upper face 25a is not limited to this embodiment. The end faces 25b are faces that are each orthogonal to the upper face 25a.

The circumferential wall 26 extends in a direction along the Z-axis and is formed into a quadrangular tube shape surrounding the platform 25. Each of the four end faces 25b of the platform 25 is in contact with the inner face of the circumferential wall 26. The circumferential wall 26 has an upper end 26a, which is formed into a quadrangular frame shape and is opened. The upper end 26a is an example of the opened end of the circumferential wall.

The platform 25 is movable within the circumferential wall 26 in the direction along the Z-axis with various devices, such as oil-pressure elevators. When the platform 25 moves uppermost, the upper face 25a of the platform 25 and the upper end 26a of the circumferential wall 26 form a substantially same plane.

The moving device 13 has a rail coupled to the material feeder 14, a conveyance arm, or other various devices, and translates the material feeder 14, for example. The moving device 13 moves the material feeder 14, for example, between a feed position P1 and a standby position P2. The feed position P1 is an example of the upside of a region. The standby position P2 is an example of a position that is off from the upside of the region.

FIG. 1 illustrates the material feeder 14 at the feed position P1 in a two-dot chain line, and illustrates the material feeder 14 at the standby position P2 in a solid line. The material feeder 14 at the feed position P1 is located above the stage 12. The material feeder 14 at the standby position P2 is located at a place that is off from the feed position P1. For example, the standby position 22 is spaced from a first position P1 in a direction along at least one of the X-axis and the Y-axis. In this manner, the moving device 13 changes a relative position of the material feeder 14 to the stage 12. The moving device 13 may move the stage 12 in relation to the material feeder 14, for example.

Figure 2:
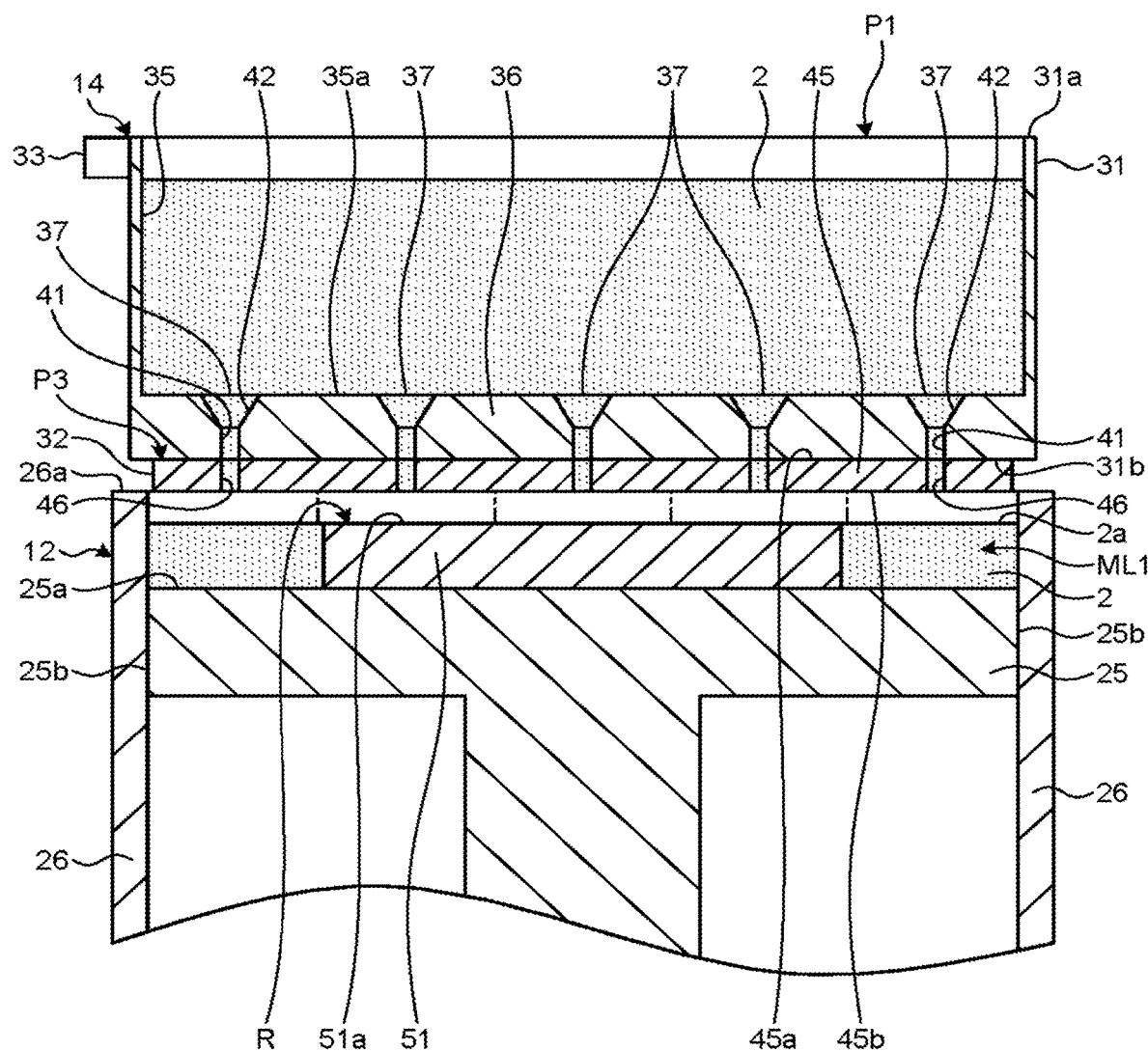
FIG. 2 is a sectional view of a stage and a material feeder at a feed position in a first embodiment.
Figure 3:
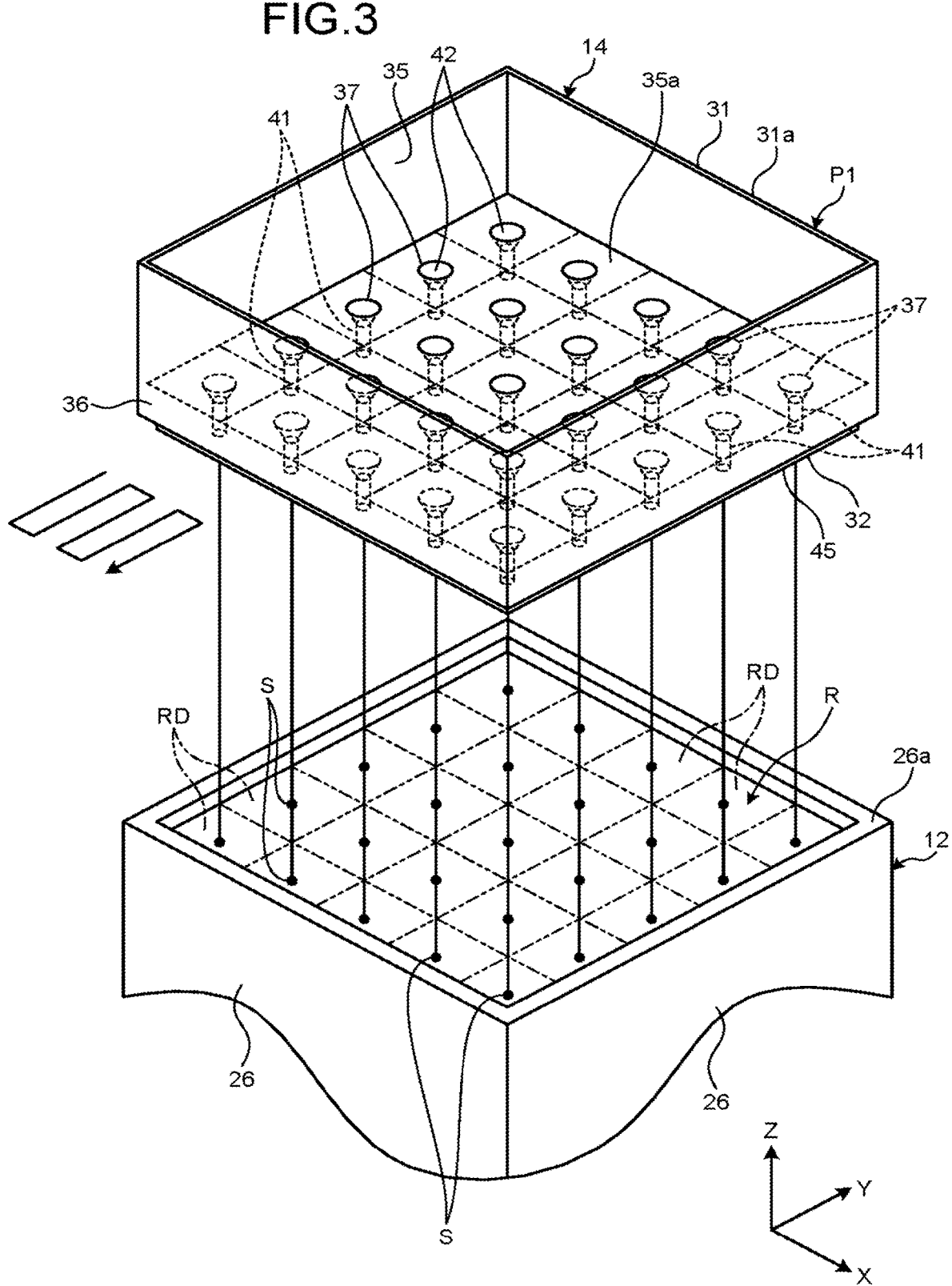
FIG. 3 is a perspective view of the stage and the material feeder at the feed position in the first embodiment.

FIG. 2 is a sectional view of the part of the stage 12 and the material feeder 14 at the feed position P1. FIG. 3 is a perspective view of the part of the stage 12 and the material feeder 14 at the feed position P1. FIG. 3 illustrates the material feeder 14 away from the stage 12 for the purpose of the description.

As illustrated in FIG. 2, the material feeder 14 includes a tank 31, a shutter 32, and a vibrator 33. The shutter 32 is an example of an opening-closing part and may be also referred to as a wall part, an obstructing part, a blocking part, a regulating part, or an adjusting pact, for example.

The tank 31 is formed into a substantially quadrangular box type. The tank 31 has an upper face 31a and a lower face 31b. The upper face 31a faces upward and is formed flat. The lower face 31b, which is located on the opposite side of the upper face 31a, faces downward and is formed flat. When the material feeder 14 is at the feed position P1, the lower face 31b faces the upper face 25a of the platform 25.

The tank 31 is provided with a container 35, a bottom wall 36, and a plurality of feed ports 37. The bottom wall 36 is an example of a first wall and may be also referred to as a lower part or a bottom part, for example. The feed ports 37 are an example of first openings, and may be also referred to as ejection ports, holes, or dropping parts, for example.

The container 35 forms cuboid-shaped recessed part that is formed into a quadrangle-shaped in a plan view and that communicates with the upper face 31a of the tank 31. The container 35 has a flat bottom face 35a. The bottom face 35a is a quadrangular flat face of 250 mm×250 mm. That is to say, the area of the bottom face 35a of the container 35 is substantially equal to the area of the upper face 25a of the platform 25. The shape of the container 35 is not limited to this example.

The container 35 contains a powdery material 2. The opening part of the container 35 in the upper face 31a of the tank 31 (the upper end of the container 35) is opened, but may be blocked with an openable and closable cover, for example.

The bottom wall 36 is a quadrangular plate-shaped part that forms the lower face 31b of the tank 31 and the bottom face 35a of the container 35. In other words, the bottom wall 36 is a part of the tank 31 that exists between the lower face 31b of tank 31 and the bottom face 35a of the container 35, and is located under the container 35. The material 2 contained in the container 35 is supported by the bottom wall 36.

The feed ports 37 are each provided in the bottom wall 36. The feed ports 37 have the substantially same shape each other. The feed ports 37 extend in the direction along the Z-axis and are each communicated with the container 35. The feed ports 37 each have a feed hole 41 and an introducing part 42. The introducing part 42 may be also referred to as a hopper, a funnel part, or a conical part, for example.

Each feed hole 41 is a circular hole that communicates with the lower face 31b of the tank 31. The feed hole 41 is provided from the lower face 31b of tank 31 to a central part in a thickness direction of the bottom wall 36. The diameter of the feed hole 41 is 6 times or more of the particle size of the material 2 and, for example, is 0.24 mm. The shape and diameter of the feed hole 41 are not limited to these examples.

Each introducing part 42 forms a conical recessed part that communicates with the bottom face 35a of the container 35. The introducing part. 42 is communicated with the feed hole 41. The inner circumferential face of the introducing part 42 gradually narrows from the opening part in the bottom face 35a toward the downward feed hole 41.

As illustrated in FIG. 3, the feed ports 37 are arranged at a substantially uniform Interval in the direction along the X-axis and the direction along the Y-axis. In other words, the feed ports 37 are arranged in the form of grid points. The feed ports 37 are arranged in a square-lattice shape, but may be arranged in other arrangements, such as a rhombic-lattice shape and a regular-triangle-lattice shape. The feed ports 37 are not limited to the form of grid points and may be arranged in other arrangements.

The distance (pitch) between one feed port 37 and another one next, to the feed port 37 is, for example, 1 mm. The pitch between the feed ports 37 is not limited to this example. The opening part of one introducing part. 42 in the bottom, face 35a of the container 35 may be in contact with or spaced from the opening part of another introducing part 42 next to the introducing part 42.

As illustrated in FIG. 2, the shutter 32 has a closure wall 45 and a plurality of communicating holes 46. The closure wall 45 is an example of a movable part and a second wall, and may be also referred to as a closing part or a sliding part, for example. Each communicating hole 46 is an example of a second opening and may be also referred to as a communicating part, an opening part, or a hole, for example.

The closure wall 45 is a substantially Quadrangular plate-like shaped, member that covers the lower face 31b of the tank 31. The shape of the closure wall 45 is not limited to this example. The closure wall 45 has an upper face 45a and a lower face 45b. The upper face 45a is in contact with the lower face 31b of the tank 31. The lower face 45b, which is located on the opposite side of the upper face 45a, faces downward and is formed flat.

When the material feeder 14 is at the feed position P1, the lower face 45b of the closure wall 45 faces the upper face 25a of the platform 25. The height (a position in the direction along the Z-axis) of the lower face 45b of the closure wall 45 is substantially equal to the height of the upper end 26a of the circumferential wall 26. Thus, the closure wall 45 blocks the opened upper end 26a of the circumferential wall 26.

The communicating holes 46 are each provided in the closure wall 45. Each communicating hole 46 is a circular hole provided from the upper face 45a of the closure wall 45 to the lower face 45b thereof. The diameter of the communicating hole 46 is 0.24 mm, for example, similarly to the diameter of the feed hole 41. The shape and diameter of the communicating hole 46 and are not limited to these examples, and the diameter of the feed hole 41 may be different from the diameter of the communicating hole 46, for example.

The communicating holes 46 are arranged at a substantially uniform interval in the direction along the X-axis and the direction along the Y-axis, similarly to the feed ports 37. The distance (pitch) between one communicating hole 46 and another one next to the communicating hole 46 is 1 mm, for example, similarly to the interval of the feed ports 37. That is to say, the communicating holes 46 are arranged in the same direction as the feed ports 37 and at the same interval, as the feed ports 37.

The closure wall 45 can move, for example, in the direction along the X-axis, with various devices including an actuator. The movement direction of the closure wall 45 is not limited to this example. The closure wall 45 moves between an opening position P3 and a closing position P1, for example. The opening position P3 is an example of a second position. The closing position P4 is an example of a first position. FIGS. 2 and 3 illustrate the closure wall 45 at the opening position P3.

When the closure wall 45 is located at the opening-position P3, the communicating holes 46 each communicate with the feed holes 41 of the feed ports 37. That is to say, each feed hole 41 is opened by the corresponding communicating hole 46.

Figure 4:
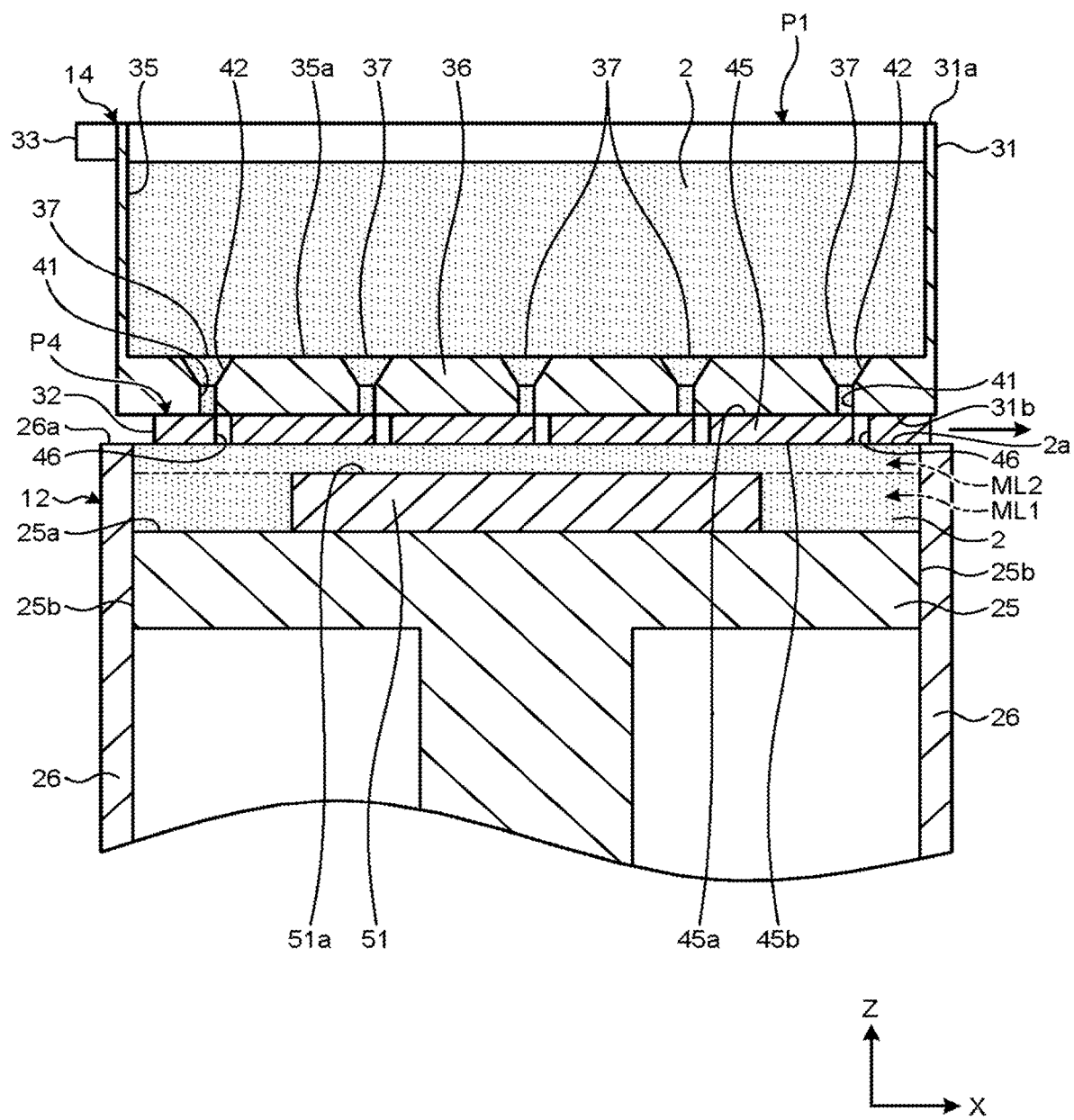
FIG. 4 is a sectional view of the stage and the material feeder with a closure wall being at a closing position in the first embodiment.

FIG. 4 is a sectional view of the part of the stage 12 and the material feeder 14 with the closure wall 45 being at the closing position P4. As illustrated in FIG. 4, when the closure wall 45 is moved to the closing position P4, the positions of the communicating holes 46 are shifted from the corresponding feed holes 41 of the feed ports 37. Thus, the closure wall 45 at the closing position P4 closes the feed holes 41 of the feed ports 37.

As illustrated in FIG. 2, the material feeder 14 is moved by the moving device 13 to the feed position P1. When the material feeder 14 is at the feed position P1, the closure wall 45 is moved to the opening position P3. In other words, the feed holes 41 of the feed ports 37 are opened by the corresponding communicating holes 46.

When the feed, holes 41 are opened, the powdery material 2 contained in the container 35 falls by gravity from the feed ports 37 and communicating holes 46. The material 2 in the container 35 is led to the feed hole 41 via the sloped inner circumferential face of each, introducing part 42. The fall amount of powders per unit time is substantially constant regardless of the height of the material 2 contained in the container 35, similarly to hourglasses.

The container 35 may be provided with a partitioning plate corresponding to each feed port 37. The partitioning plate partitions the material 2 contained in the container 35, and causes the material 2 to be uniformly led to the corresponding introducing part 42 of the feed port 37.

The vibrator 33 is, for example, a motor that turns an eccentric weight. The vibrator 33 vibrates the material feeder 14. The vibration of the material feeder 14 facilitates the material 2 in the container 35 falling from the feed ports 37 and communicating holes 46.

The optical device 15 illustrated in FIG. 1 includes various parts, such as a light source that, has an oscillation element and emits a laser beam L, at conversion lens that converts the laser beam L into a parallel beam, a converging lens that causes the laser beam to converge, and a galvano mirror that moves an irradiated position of the laser beam L. The optical device 15 can change the power density of the laser beam L.

The optical device 15 is located above the stage 12. The optical device 15 may be placed at another place. The optical device 15 converts the laser beam L that the light source emits into a parallel beam with the conversion lens. The optical device 15 causes the laser beam L to reflect on the galvano mirror, which can change its tilt angle, and causes the laser beam L to converge with the converging lens, to irradiate the desired position with the laser beam L.

The material replenishing device 16 can contain more material 2 than the container 35. The material replenishing device 16 is placed above the standby position P2 and has an openable and closable door. When the material feeder 14 is at the standby position P2, the door faces the container 35, which communicates with the upper face 31a of the tank 31.

When the material feeder 14 is located at the standby position P2, the material replenishing device 16 opens the door and feeds the material 2 to the container 35. When the material feeder 14 is not located at the standby position P2, the material replenishing device 16 closes the door to prevent the material 2 from falling.

The controller 17 is electrically connected to the stage 12, the moving device 13, the material feeder 14, the optical device 15, and the material replenishing device 16. For example, the controller 17 has various electronic components, such as a CPU, a ROM, and a RAM. The controller 17 reads and executes a program stored in the ROM or other storage devices to control the stage 12, the moving device 13, the material feeder 14, the optical device 15, and the material replenishing device 16. The three-dimensional printer forms the manufactured object 3 based on the control (program) of the controller 17.

Hereinafter, it will be described that an example of a procedure in which the three-dimensional printer 1 forms the manufactured object 3 from the powdery material 2. A method in which the three-dimensional printer 1 forms the manufactured object 3 is not limited to the description below.

First, three-dimensional shape data of the manufactured object 3 is input to the controller 17 of the three-dimensional printer 1, for example, from an external personal computer. The three-dimensional shape data is data for CAD, for example, but is not limited to this example.

Next, the material replenishing device 16 feeds the material 2 to the container 35 of the material feeder 14 at the standby position P2. The controller 17 weighs the material 2 contained in the container 35 with a sensor, for example, and forces the material replenishing device 16 to feed the material 2 to the container 35 until the weight reaches a certain value. As a result, the container 35 contains a certain amount of the material 2. When the container 35 has already contained a certain amount of the material 2, feeding the material 2 from the material replenishing device 16 may be omitted.

The closure wall 45 of the material feeder 14 is usually located at the closing position P4. Thus, the feed port 37 is closed by the closure wall 45, and it is prevented that the material 2 contained in the container 35 falls from the feed ports 37.

Then, the moving device 13 moves the material feeder 14 from the standby position P2 to the feed position P1. When arriving at the feed position P1, the material feeder 14 feeds the material 2 onto the stage 12 as follows.

As illustrated in FIG. 2, a base 51 is mounted and fixed on the upper face 25a of the platform 25 of the stage 12. The base 51 is provided to form the manufactured object 3 thereon. The manufactured object 3 may be directly formed on the upper face 25a of the platform 25, without the base 51 being placed on the upper face 25a of the platform 25.

The base 51 is a quadrangular plate-like shaped member, for example. The shape of the base 51 is not limited to this example, and is determined depending on the shape of the manufactured object 3. The base 51 has a flat upper face 51a. The upper face 51a of the base 51 is parallel to the upper face 25a of the platform 25.

First, the platform 25 of the stage 12 is placed so that the distance between the upper face 51a of the base 51 and the upper end 26a of the circumferential wall 6 in the direction along the Z-axis is 50 µm. Thus, the distance between the upper face 51a of the base 51 and the lower face 45b of the closure wall 45 of the material feeder 14 at the feed position P1 is 50 µm.

The material 2 is spread all over around the base 51 in advance. A surface 2a of the material 2 spread all over forms the substantially same plane as the upper face 51a of the base 51. As a result, the material 2 and the base 51 form a single layer ML1 on the upper face 25a of the platform 25.

The surface 2a of the material 2 and the upper face 51a of the base 51 that forms the layer ML1 form a feed region R. The feed region R is an example of a region to which material is fed. The feed region R is also formed by a plurality of layers ML2, ML3, ML4, ... of the material 2, which are piled on the layer ML1, as described below.

The feed region R is a substantially flat, quadrangular face of 250 mm □ 250 mm, similarly to the upper face 25a of the platform 25. The shape of the feed region R may be different from the shape of the upper face 25a of the platform 25. The distance between the feed region R and the lower face 45b of the closure wall 45 of the material feeder 14 at the feed position P1 is 50 µm. The distance between the feed region R and the lower face 45b of the closure wall 45 may be changed to, for example, 30 µm and 100 µm, by the control of the platform 25 caused by the controller 17. The feed region R is surrounded by the circumferential wall 26.

The bottom wall 36 of the material feeder 14 at the feed position P1 is located above the feed region R. The bottom wall 36 covers the entirety of the feed region R. The bottom wall 36 may partially cover the feed region. R. The lower face 31b of the tank 31 and the lower face 45b of the closure wall 45 face the feed region R.

When the material feeder 14 arrives at the feed position P1, the controller 17 causes the closure wall 45 to move to the opening position P3. This causes the communicating holes 46 of the shutter 32 to be communicated with the corresponding feed holes 41 of the feed, ports 37, and causes the feed ports 37 to be opened.

The material feeder 14 is vibrated by the vibrator 33. As a result, through the feed ports 37 and the communicating holes 46, the material 2 in the container 35 falls onto the feed region R. The material feeder 14 feeds the material 2 to the feed region R from the feed ports 37 in parallel. The first material feeder 14 may not have the vibrator 33. If there were no vibration caused by the vibrator 33, the material 2 falls by gravity from the feed ports 37 and communicating holes 46.

As illustrated in FIG. 3, the feed region R is defined as it having a plurality of divided sections RD, in the present specification. The divided sections RD are an example of a plurality of sections. The divided sections RD are quadrangular sections, for example. Each divided section RD is not limited to this example and may be other shapes. Each of the divided sections RD has a substantially same shape each other.

The areas of the divided sections RD are equal to each other. The divided sections RD are each arranged in the direction along the X-axis and the direction along the Y-axis. The feed ports 37 and communicating holes 46 face the corresponding divided sections RD. That is to say, each feed port 37 and communicating hole 46 is located above the corresponding divided section RD, and oppose (face) the divided section RD.

The feed ports 37 and communicating holes 46 each feed the material 2 to the corresponding divided sections RD. FIG. 3 illustrates respective fall spots S of the material 2 that has fallen from each feed port 37 and communicating hole 46. Each fall spot S is an example of a position to which the material is fed. The fall spot 8 is located in the divided section RD corresponding to each feed port 37 and communicating hole 46.

While the material 2 is fed to the feed region R from the feed ports 37 and communicating holes 46, the material feeder 14 is moved, for example, by the moving device 13, in the direction along the X-axis and the direction along the Y-axis, as indicated by the arrow in FIG. 3. As a result, each fall spot S to which the material 2 falls from corresponding feed port 37 and communicating hole 46 moves within the corresponding divided section RD, as indicated by the arrow in FIG. 3. The fall spot S moves within the divided section RD so as to trace with a single stroke. Thus, the material 2 is substantially evenly fed to each divided section RD.

The material 2 is fed to each divided section RD, so that the feed region R is filled with a layer of the material fed to the divided section RD and a continuous layers ML2 of the material 2 is formed, throughout the entirety of the feed, region R. In other words, the layer ML2 of the material 2 is placed on the layer ML1. The amount of the material 2 fed to each divided section RD is substantially equal. Thus, the thickness of the layer ML2 formed in the feed region R is substantially equal regardless of its position.

When the layer ML2 Is formed in the feed region R, the surface 2a of the material 2 that forms the layer ML2 touches the lower face 45b of the closure wall 45. In the position to which the material 2 is fed, each communicating hole 46 is closed by the material 2.

The controller 17 counts, for example, with a timer, an elapsed time after the closure wall 45 moves to the opening position P3 and the feed ports 37 are opened. When a certain time has elapsed after the feed ports 37 being opened, the controller 17 causes the closure wall 45 to move from the opening position P3 to the closing position P4 and causes the closure wall 45 to close the feed ports 37. The fall speed of powders that, pass each feed port 37 is substantially constant, and thus the fall amount thereof can be controlled with times for which the feed ports 37 are opened.

The lower face 45b of the closure wall 45, which moves from the opening position P3 to the closing position P4, slides on the surface 2a of the material. 2 in contact with the lower face 45b. This causes the surface 2a of the fed material 2 to be leveled.

When the layer ML2 of the material 2 is formed in the feed region R as above, the moving device 13 moves the material feeder 14 from the feed position P1 to the standby position P2. As the material feeder 14 moves from the feed position P1 to the standby position P2, the lower face 45b of the closure wall 45 slides on the surface 2a of the material 2 in contact with, the lower face 45b. This causes the surface 2a of the fed material 2 to be further flattened.

Next, as illustrated in FIG. 1, the controller 17 controls the optical device 15 to cause if to irradiate the material 2 that forms the layer ML2 with the laser beam L from the optical device 15. The controller 17 determines an irradiated position of the laser beam L, based on the input three-dimensional shape data of the manufactured object 3.

In the layer ML2 of the material 2, the part irradiated with the laser beam L melts. In other words, the material 2 is irradiated with the laser beam L to be solidified after being partially melted. As a result, a part (one layer) of the manufactured object 3 is formed in the layer ML2 of the material 2. The material 2 may be sintered.

While the layer ML2 of material 2 is irradiated with the laser beam L, the material replenishing device 16 feeds the material 2 to the container 35 of the material feeder 14. The volume of the material 2 contained in the container 35 is larger than the volume of the layer ML2 of the material 2 formed in the feed region R.

When the optical device 15 finishes irradiating the material 2 of the layer ML2 with the laser beam L, the platform 25 moves downward, for example, by 50 μm. The distance by which the platform 25 moves is equal to the thickness of the layer ML2. As a result, the distance between the surface 2a of the material 2 that forms the layer ML2 and the upper end 26a of the circumferential wall 26 is 50 μm.

The surface 2a of the material 2 that forms the layer ML2 and the surface of the part, of the manufactured object 3 formed in the layer ML2 form the feed region R in the layer ML2. The moving device 13 moves the material feeder 14 to the feed position P1 again. The material feeder 14 feeds the material 2 to the feed region R that the layer ML2 forms, at the feed position P1.

Figure 5:
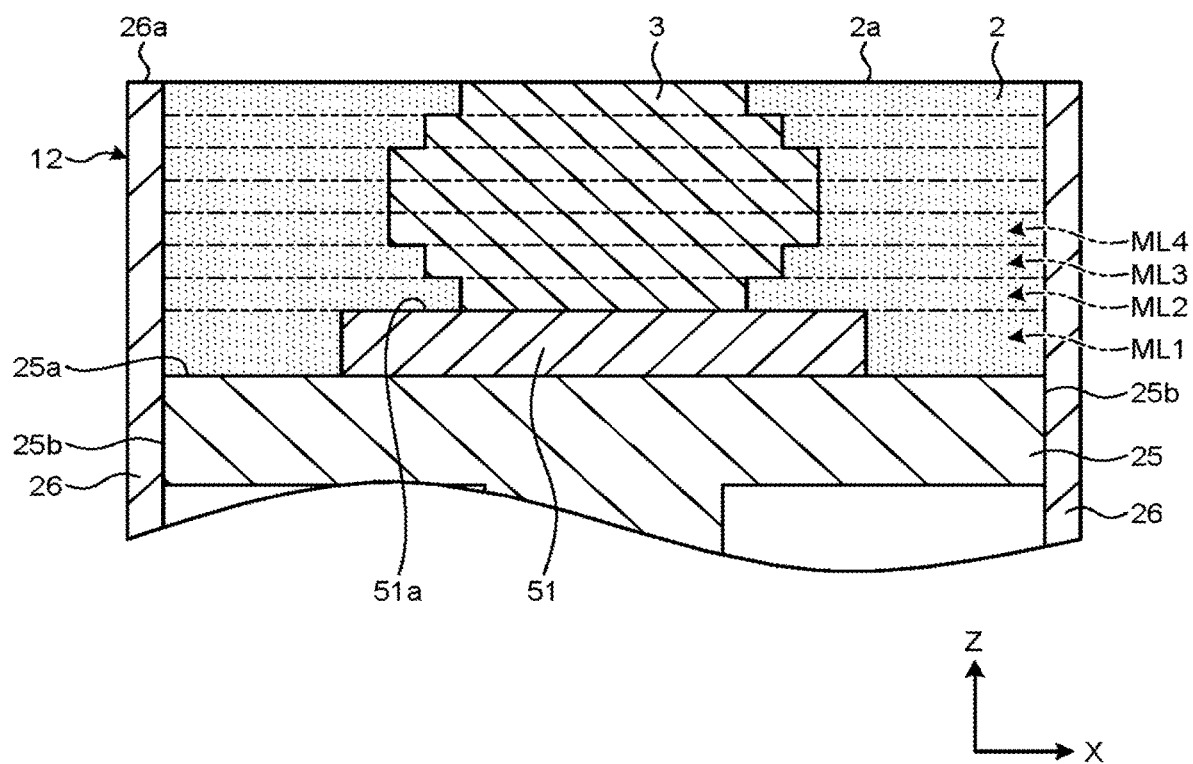
FIG. 5 is a sectional view of the stage with a manufactured object being formed in the first embodiment.

FIG. 5 is a sectional view of the stage 12 with the manufactured object 3 being formed. As illustrated in FIG. 5, the material feeder 14 stacks the material 2 similarly to the above description, and sequentially forms a plurality of layers ML2, ML3, ML4, . . . of the material 2. In FIG. 5, the layers ML2, ML3, ML4, . . . are divided by a two-dot chain line.

The optical device 15 partially melts the material 2 of the layers ML2, ML3, ML4, . . . , and forms a part of the manufactured object 3, each time the layers ML2, ML3, ML4, . . . are formed. The three-dimensional printer 1 repeats the formation of the layers ML2, ML3, ML4, . . . of the material 2 caused by the material feeder 14 and the fusion of the material 2 caused by the optical device 15 to form the three-dimensionally shaped manufactured object 3.

The manufactured object 3, which is formed within the treatment tank 11, is taken out of the treatment chamber 11a by the opening of a cover of the treatment tank 11, for example. Without being limited to this example, the manufactured object 3 may be conveyed outside the treatment chamber 11a by a conveying device having a conveyance arm and other components, for example. The manufactured object 3 is conveyed to a room (an antechamber) that is isolated from the treatment chamber 11a by an openable and closable door, for example.

In the three-dimensional printer 1 according to the first embodiment, the material feeder 14 feeds the material 2 from the feed ports 37 provided in the bottom wall 36 to the feed region R in parallel to form the layer ML2, ML3, ML4, . . . of the material 2 in (to place the material 2 on) the feed region R. This shortens the distance by which the material feeder 14 moves above the feed region R to form the layer ML2, ML3, ML4, . . . of the material 2 in the feed region R and reduces forming time of the layers ML2, ML3, ML4, . . . of the material 2 in the feed region R. Furthermore, providing the feed port 37 in number corresponding to the size of the feed, region R causes the forming time of the layers ML2, ML3, ML4, . . . of the material 2 in the feed region R to be constant regardless of the size of the feed region R. For example, for the size of the feed region R of 1000 mm×0.1000 mm, if the number of feed ports 37 per unit, area is the same as the present, embodiment, the forming time of the layers ML2, ML3, ML4, . . . of the material 2 is the same as the present, embodiment.

The material 2 falls by gravity from the feed ports 37, so that the material 2 is fed to the feed region R. This simplifies the structure of the material feeder 14 and reduces the forming time of the layers ML2, ML3, ML4, . . . of the material 2 in the feed region R. Furthermore, for powders, their fall speed is substantially constant regardless of the height of the material 2 in the container 35, similarly to hourglasses. Thus, the feed amount is relatively easily controlled using the opening time of the feed ports 37.

The feed ports 37 are placed in the bottom wall 36 in the form of grid point. This equalizes the distance between the positions (the fall spots S) to which the material 2 is fed and reduces the variation of the amount of the material 2 in the feed region R.

The shutter 32 opens and closes the feed ports 37. Thus, when the material feeder 14 is at a position off from the feed region R, such as the standby position P2, the exit of the material 2 from the feed ports 37 is suppressed. Furthermore, the configuration that suppresses the material from leaking is implemented in a relatively simple configuration.

At the closing position P4, the closure wall 45 closes the feed ports 37. When the closure wall 45 is at the opening position P3, the communicating holes 46 each communicate with the feed ports 37, and the feed ports 37 are opened. This causes the feed port 37 to be opened and closed easily.

The vibrator 33 vibrates the material feeder 14 to facilitate the material 2 falling from the feed ports 37 to the feed region R. As a result, the material is evenly fed from the feed ports 37.

The material feeder 14, in which the feed ports 37 each feed the material 2 to the corresponding divided sections RD, forms the continuous layers ML2, ML3, ML4, . . . of the material 2 in the feed region R. This shortens the distance by which the material feeder 14 moves above the feed region R to within the extent of the divided section RD, and reduces the forming time of the layers ML2, ML3, ML4, . . . of the material 2 in the feed region R. In other words, the layers ML2, ML3, ML4, . . . are formed by feeding the material to each divided section RD in parallel. Thus, the material 2 is fed to a wider range in relatively short time, and the variation of the amount and thickness of the material 2 depending on its position is reduced. Furthermore, each feed port 37 feeds the material 2 to the corresponding divided section RD, to form the layers ML2, ML3, ML4, . . . of the material 2 in the feed region R. This causes the forming time of the layers ML2, ML3, ML4, . . . of the material 2 in the feed region R to be constant regardless of the size of the feed region R.

The material feeder 14 moves sac that the fall spots S of the material 2 move within the divided sections RD. As a result, the material 2 is fed to each of the divided sections RD thoroughly, and the material 2 is evenly fed to the feed region R.

If the size of the feed hole 41 and the size of the material 2 are constant, the amount by which the powdery material 2 falls from the feed port 37 is determined depending on time. The controller 17 controls the opening time of the feed ports 37 with the shutter 32, and closes the feed ports 37 when a certain time has elapsed after the feed ports 37 being opened. This causes the amount of the material 2 fed to the feed region R to be constant.

The closure wall 45 moves from the opening position P3 to the closing position P4 to level the layers ML2, ML3, ML4, . . . of the material 2 formed in the feed region R. As a result, the surface 2a of the material 2 fed to the feed region R is easily flattened and the material 2 is evenly melted by the laser beam L.

The material replenishing device 16 feeds the material 2 to the container 35 of the material feeder 14 at the standby position P2. As a result, the material 2 is fed to the container 35 while the layers ML2, ML3, ML4, . . . of the material 2 is melted by the optical device 15, and the manufactured object 3 is effectively formed.

Hereinafter, a second embodiment will be described with reference to FIGS. 6 and 7. In the description of the following embodiments, a component having the same function as an aforementioned component has the same reference sign as the aforementioned component, and the description thereof may be omitted. Furthermore, the components with the same reference sign are not limited to have all functions and properties in common, but may have different functions and properties according to each embodiment.

Figure 6:
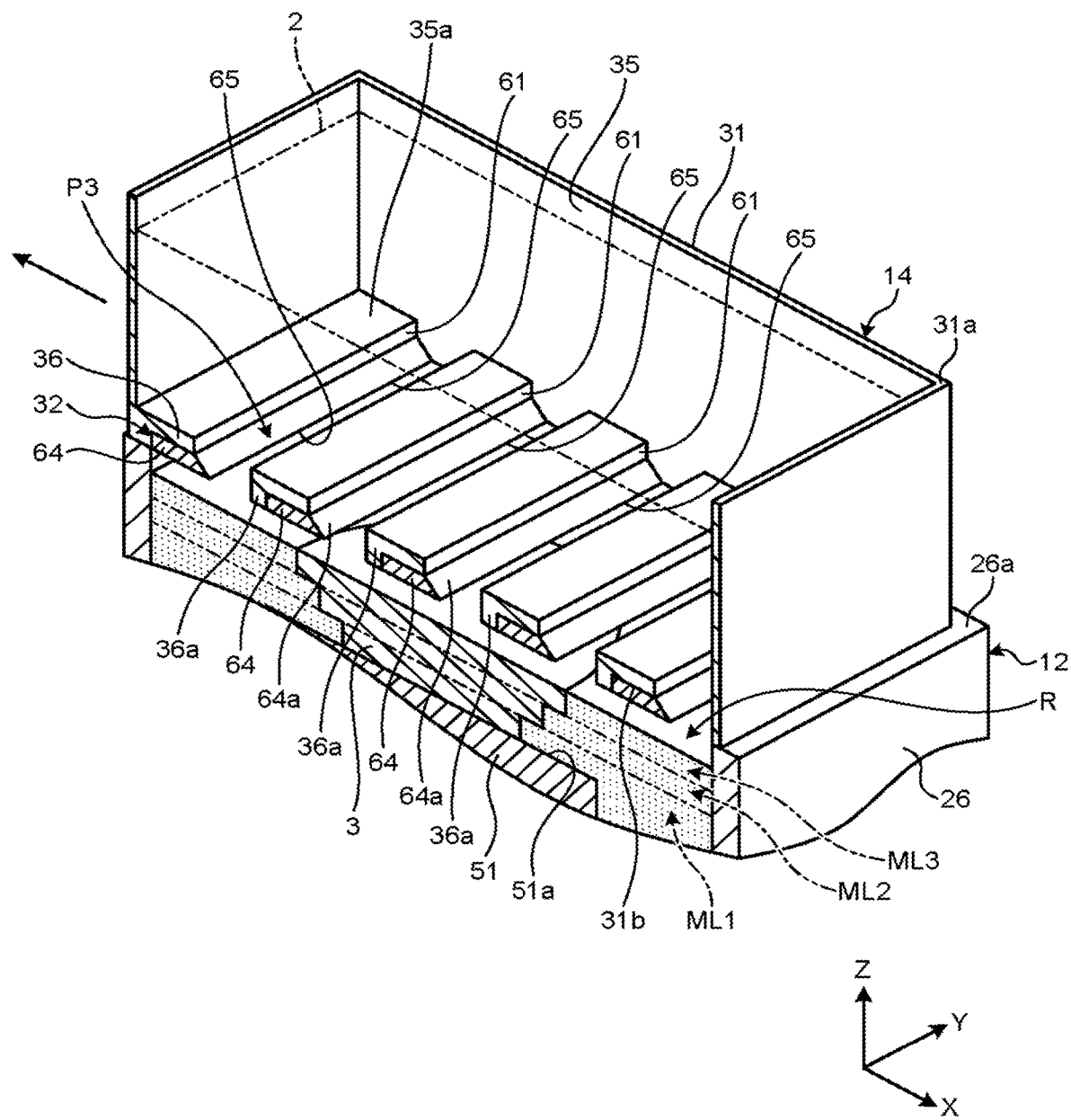
FIG. 6 is a perspective view of the stage and the material feeder at the feed position according to a second embodiment.

FIG. 6 is a partially perspective view of the stage 12 and the material feeder 14 at the feed position P1 according to the second embodiment. FIG. 6 illustrates the material 2 contained in the container 35 in a two-dot chain line. As illustrated in FIG. 6, the tank 31 of the second embodiment is provided with a plurality of first slits 61 instead of the feed ports 37. Each first slit 61 is an example of the first opening.

The first slits 61 are each provided in the bottom wall 36. The first slits 61 are provided from the lower face alb of the tank 31 to the bottom face 35a of the container 35 and extend, for example, in the direction along the Y-axis. The direction along the Y-axis is an example of a first direction. The first slits 61 are arranged at a substantially uniform interval in the direction along the X-axis. The direction along the X-axis is an example of a second direction. The width (the dimension in the direction along the X-axis) of each first slit 61 is 6 times or more of the particle size of the material 2 and, for example, is 0.24 mm. The shape and width of each first slit 61 are not limited to these examples.

The shutter 32 of the second embodiment has a plurality of closure plates 64 instead of the closure wall 45. Each closure plate 64 is an example of a second wall. The closure plates 64 extend in the direction along the Y-axis. The closure plates 64 are arranged at a substantially uniform interval in the direction along the X-axis. The width (the dimension in the direction along the X-axis) of each closure plate 64 is either substantially equal to or larger than the width of the first slit 61.

One end in the direction along the X-axis of each closure plate 64 is provided with a knife edge 64a. Each knife edge 64a is a part of the closure plate 64, which has the bottom face of the closure plate 64 that faces downward and the side face of the closure plate 64 that slants at an acute angle to the bottom face.

Second slits 65 are each provided between the closure plates 64. The second slits 65 extend in the direction along the Y-axis. The second slits 65 are arranged at a substantially uniform interval in the direction along the X-axis.

Figure 7:
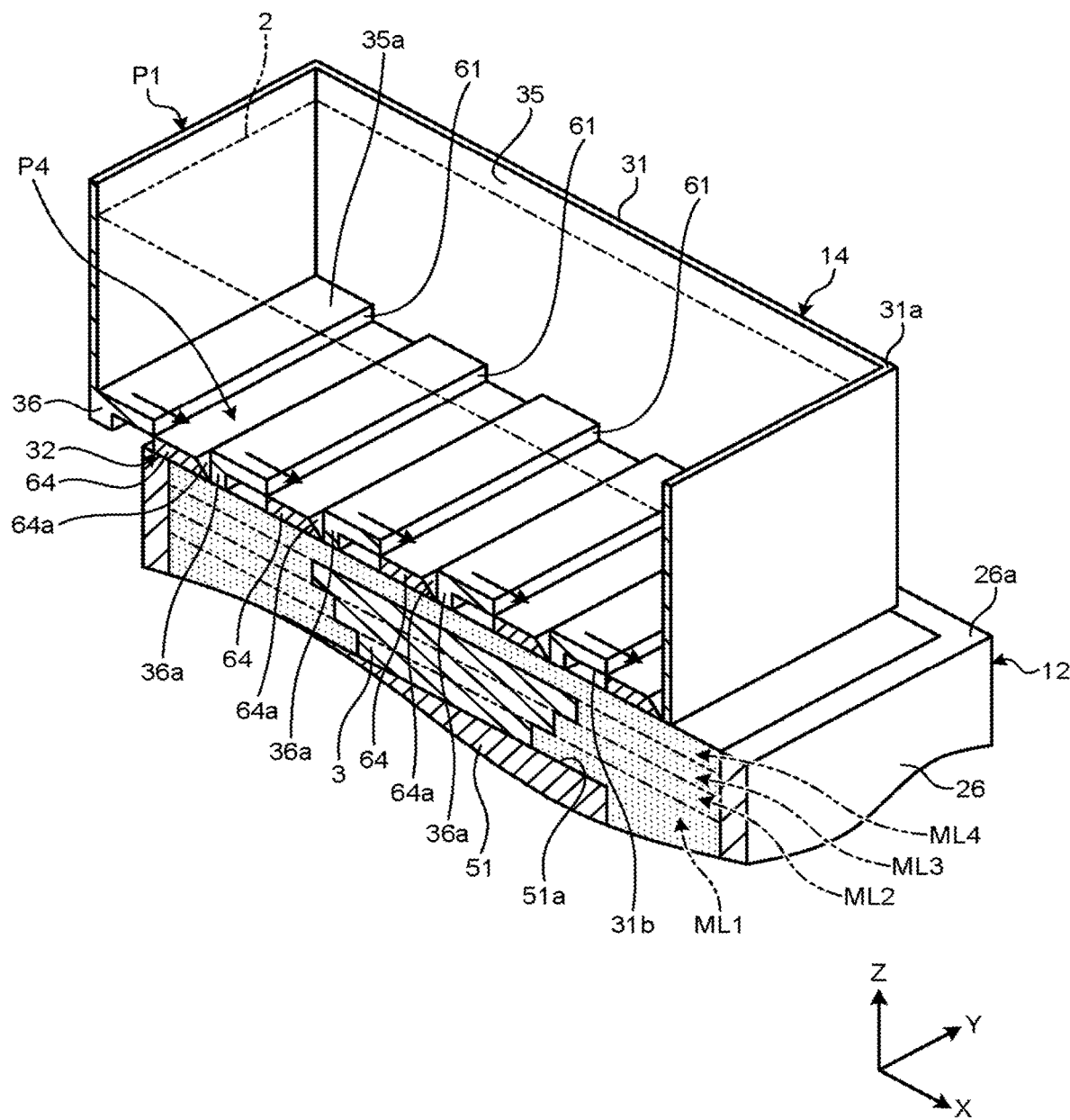
FIG. 7 is a sectional view of the stage and the material feeder with the closure plate being at the closing position in the second embodiment.

FIG. 7 is a partially perspective view of the stage 12 and the material feeder 14 with the closure plates 64 being at the closing position P4. As illustrated in FIGS. 6 and 7, the closure plates 64 are integrally movable in the direction along the X-axis. The closure plates 64 may be individually movable. The closure plates 64 move between the opening position P3 illustrated in FIG. 6 and the closing position P4 illustrated in FIG. 7.

As illustrated in FIG. 6, the closure plates 64 at the opening position P3 overlap the bottom wall 36, which is provided with the first slits 61. When the closure plates 64 are at the opening position P3, the second slits 65 of the shutter 32 communicate with the corresponding first slits 61 of the tank 31. This causes the first slits 61 to be opened.

As illustrated in FIG. 7, the closure plates 64 at the closing position P4 close the first slits 61. When the closure plates 64 are at the closing position P4, the knife edges 64a of the closure plates 64 each contacts a plurality of receiving parts 36a provided in the bottom wall 36. Each receiving part 36a projects from the lower face 31b of the tank 31 and is a convex part that extends in the direction along the Y-axis.

As illustrated in FIG. 6, the material feeder 14 of the second embodiment described above moves the closure plates 64 to the opening position P3, at the feed position P1. This causes the first slits 61 to be opened. The material 2 contained in the container 35 falls from the first slits 61 to the feed region R in parallel.

As indicated by an arrow in FIG. 6, while the material 2 is fed to the feed region R from the first slits 61, the material feeder 14 moves in the direction along the X-axis. In other words, the material feeder 14 moves in a direction intersecting the direction to which the first slits 61 extend. As a result, the material 2 is fed to the feed region R thoroughly. When the material feeder 14 moves, the receiving parts 36a and the closure plates 64 slide on the surface of the fed material 2 and level the surface of the material 2.

As illustrated in FIG. 7, when the material 2 has been fed to the feed region R, the material feeder 14 moves the closure plates 64 to the closing position P4. The closure plates 64 is provided with the knife edges 64a, so that the closure plates 64 easily moves from the opening position P3 to the closing position P4.

The closure plates 64 move from the opening position P3 to the closing position P4 to close the first slits 61 and to slide on the surface 2a of the fed material 2. As a result, the closure plates 64 level any unevenness formed in the surface 2a of the material 2 and flatten the surface 2a of the material 2.

In the three-dimensional printer 1 of the second embodiment, the material feeder 14 feeds the material 2 to the feed region R from the first slits 61 in parallel. In this manner, the first opening is not limited the feed port 37 of the first embodiment and the first slit 61 of the second embodiment, and is formed into various shapes.

Figure 8:
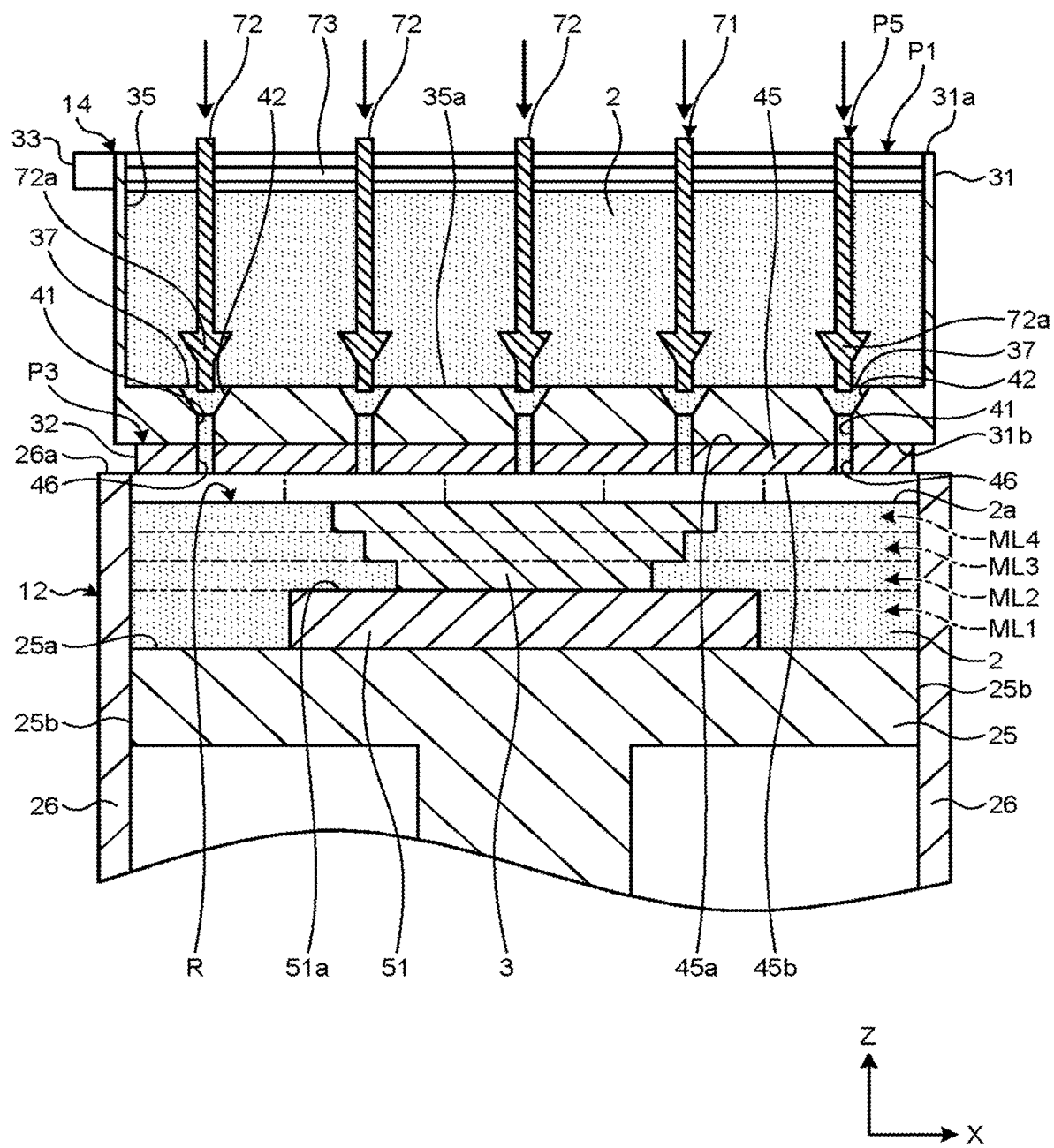
FIG. 8 is a sectional view of the stage and the material feeder according to a third embodiment.

Hereinafter, a third embodiment will be described with reference to FIGS. 8 and 9. FIG. 6 is a sectional view of a part of the stage 12 and the material feeder 14 according to the third embodiment. As illustrated in FIG. 8, the material feeder 14 of the third embodiment further has an obstructing part 71. The obstructing part is an example of an opening-closing part.

The obstructing part 71 has a plurality of pistons 72 and a supporting member 73. Each piston 72 is an example of a valve member and may be also referred to as a structure, an extrusion part, a pressurization part, an insertion part, or a plug, for example. The supporting member 73 may be also referred to as a coupling unit or a moving unit.

Each piston 72 is formed into a rod shape that extends in the direction along the Z-axis. One end of the piston 72 is provided with a valve part 72a. Each valve part 72a has a shape corresponding to the feed port 37. That is to say, the valve part 72a has a rod-shaped part that can fit into the feed hole 41 and a conical part that can fit into the introducing part 42.

The pistons 72 are placed in the container 35 so that the valve parts 72a face the corresponding feed ports 37. The valve parts 72a of the pistons 72 are buried in the material 2 contained in the container 35. The valve parts 72a may be located outside the container 35.

The supporting member 73 supports the pistons 72. The pistons 72, which are supported by the supporting member 73, are arranged at a substantially uniform interval in the direction along the X-axis and the direction along the Y-axis. That is to say, the pistons 72 are arranged in the same manner as the feed ports 37 and at the same interval as the feed ports 37.

The supporting member 73 can move the pistons 72 in the direction along the Z-axis, with various devices including an actuator. In other words, the supporting member 73 moves the pistons 72, which is provided with the valve parts 72a, in a direction intersecting the bottom wall 36. The pistons 72 may be individually movable.

Figure 9:
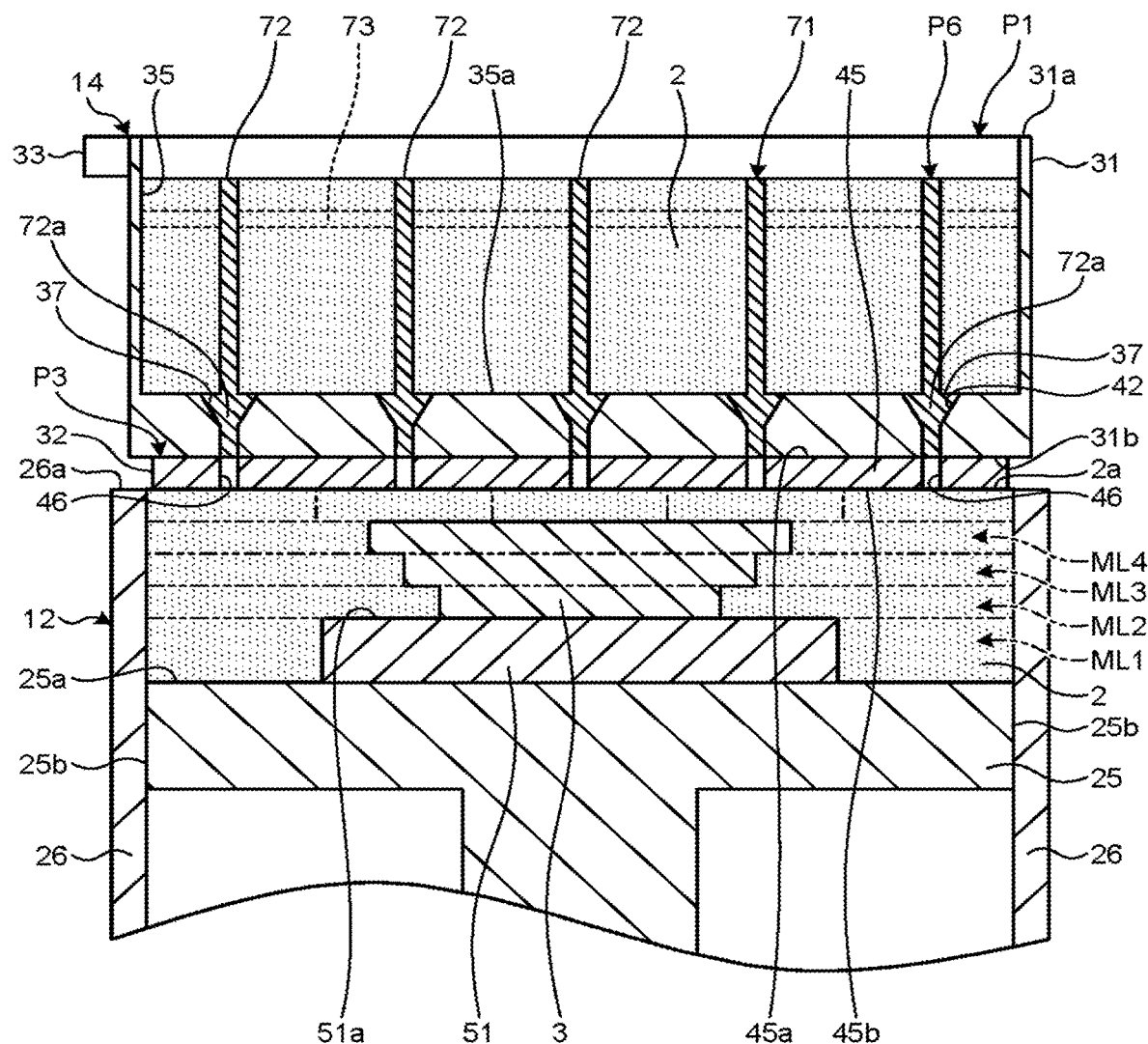
FIG. 9 is a sectional view of the stage and the material feeder with a piston being at a closing position in the third embodiment.

FIG. 9 is a sectional view of the part of the stage 12 and the material feeder 14 with the pistons 72 being at a closing position P6. The pistons 72 move between an opening position P5 illustrated in FIG. 8 and the closing position P6 illustrated in FIG. 9, for example.

As illustrated in FIG. 8, the pistons 72 at the opening position P5 are spaced from the feed port 37. In other words, the valve parts 72a of the pistons 72 at the opening position P5 are spaced from the corresponding feed ports 37 to open the feed ports 37.

As illustrated in FIG. 9, the valve parts 72a of the pistons 72 at the closing position P6 fit into the corresponding feed ports 37. The conical part of each valve part 72a is very close to the introducing part 42. In this manner, the valve parts 72a moved to the closing position P6 close the feed ports 37.

As illustrated in FIG. 8, the material feeder 14 of the third embodiment described above moves the pistons 72 to the opening position P5, at the feed position P1. This causes the feed port 37 to be opened. The material 2 contained in the container 35 falls from the feed ports 37 to the feed region R in parallel.

The pistons 72 moved to the opening position P5 gradually moves towards the closing position P6. The valve part 72a of each piston 72, which moves from the opening position P5 to the closing position P6, pushes the material 2 located between the valve part 72a and the feed port 37 towards the feed port 37. As 3 result, the material 2 is extruded from the feed ports 37 by the pistons 72 and is fed to the feed region R.

When a certain time elapses after the movement of the pistons 72 to the opening position P5, the pistons 72, which move towards the closing position P6, arrive at the closing position P6. The material 2 in the feed holes 41 is extruded from the feed holes 41 by the valve parts 72a of the pistons 72.

As illustrated in FIG. 9, the valve parts 72a of the pistons 72, which have arrived at the closing position P6, fit into the feed ports 37 to close the feed ports 37. That is to say, when a certain time has elapsed after the pistons 72 opening the feed ports 37, the valve parts 72a of the pistons 72 close the feed ports 37. As a result, the material 2 is fed to the feed region R.

In the three-dimensional printer 1 of the third embodiment, the pistons 72 at the closing position P6 fit into the feed ports 37 to close the feed ports 37. This causes the feed ports 37 to be opened and closed easily.

The pistons 72 move from the opening position P5 to the closing position P6, to each extrude the material 2 in the container 35 into the feed ports 37 and fit into the feed ports 37 to close the feed ports 37. This further reduces the feeding time of the material 2 to the feed region R, and causes the amount of the material 2 to be constant more easily.

Figure 10:
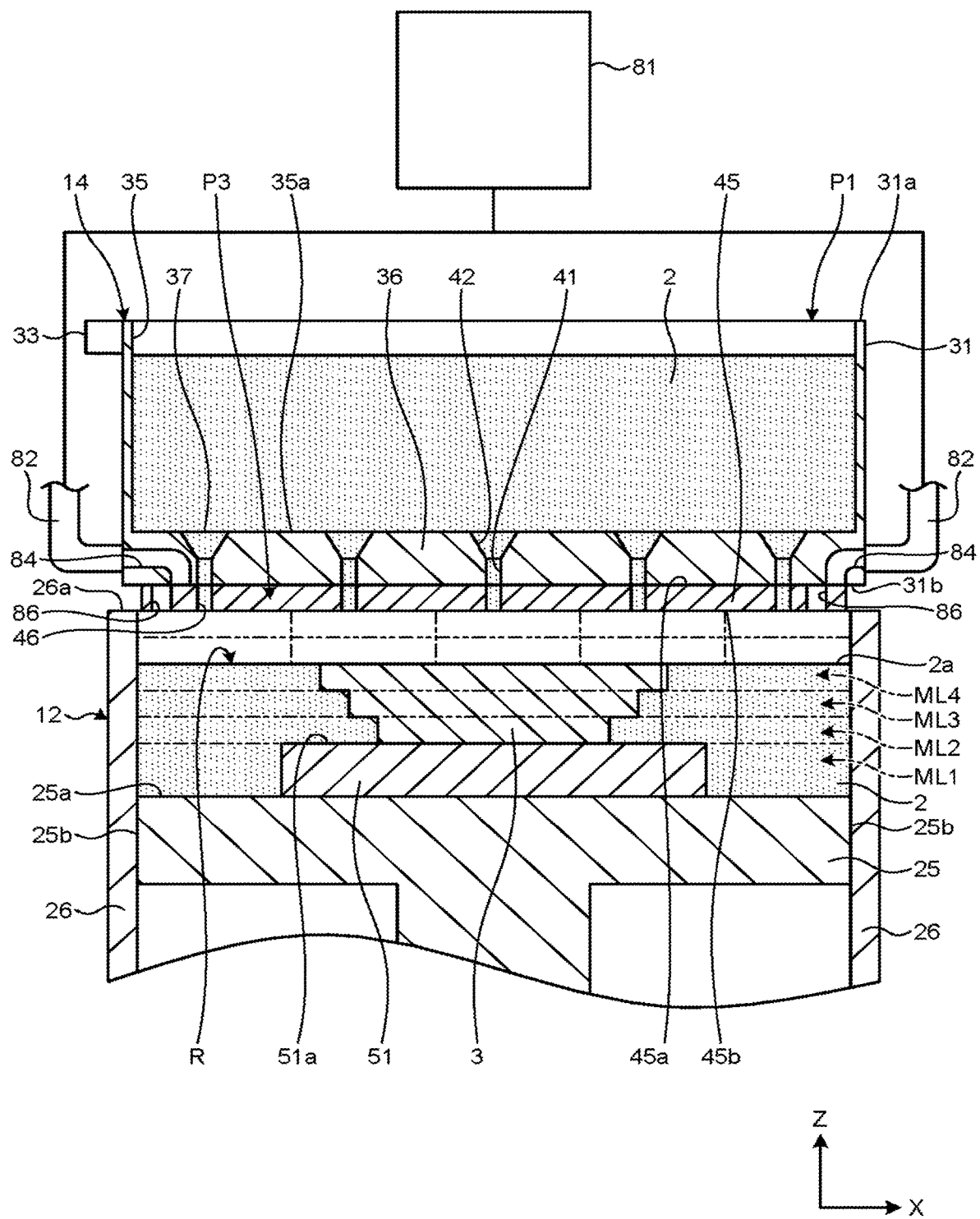
FIG. 10 is a sectional view of the stage and the material feeder according to a fourth embodiment.

Hereinafter, a fourth embodiment will be described with reference to FIGS. 10 to 12. FIG. 10 is a sectional view of a part of the stage 12 and the material feeder 14 according to the fourth embodiment. As illustrated in FIG. 10, the three-dimensional printer 1 of the fourth embodiment further has an air supplying device 81. The air supplying device 81 is an example of a blowing part.

The air supplying device 81 is an air compressor, for example. The air supplying device 81 is communicated with the material feeder 14 through a plurality of tubes 82. Each tube 82 is formed of a flexible synthetic resin, for example.

The tank 31 of the material feeder 14 is provided with a plurality of air supply paths 84. One end of each air supply path 84 is communicated with the tube 82. The other end of the air supply path 84 communicates with the lower face 31b of the tank 31. As illustrated in FIG. 10, the closure wall 45 at the opening position P3 closes the opening parts of the air supply paths 84 in the lower face 31b of the tank 31.

The closure wall 45 of the shutter 32 is provided with a plurality of blow ports 86. Each blow port 86 is a hole provided from the upper face 45a of the closure wall 45 to the lower face 45b thereof. When the closure wall 45 is located at the closing position P4, the blow ports 86 communicate with the corresponding air supply paths 84. In other words, the blow ports 86 open the air supply paths 94.

In the three-dimensional printer 1 of the fourth embodiment described above, the platform 25 is lowered so that the distance between the feed region R and the lower face 45b of the closure wall 45 is 100 µm. That is to say, the distance between the feed region R and the lower face 45b of the closure wall 45 is larger than the thickness of the layer of the material 2 that the material feeder 14 forms.

The material feeder 14 at the feed position P1 moves the closure wall 45 to the opening position P3 to open the feed ports 37. As a result, the material feeder 14 feeds the material 2 to the feed region R from the feed ports 37 in parallel.

When a certain time elapses after the movement of the closure wall 45 to the opening position P3, the controller 17 moves the closure wall 45 to the closing position P4. This causes the feed ports 37 to be closed by the closure wall 45. The distance between the surface 2a of the material 2 fed to the feed region R in this way and the lower face 45b of the closure wall 45 is 50 µm. That is to say, the lower face 45b of the closure wall 45 is spaced from the material 2 fed to the feed region R.

The closure wall 45 moves to the closing position P4, so that the air supply paths 84 are opened by the blow ports 86. The air supplying device 81 sends air (blows air) into a space surround by the circumferential wall 26 and the closure wall 45 through the tubes 82, the air supply paths 84, and the blow ports 86.

Figure 11:
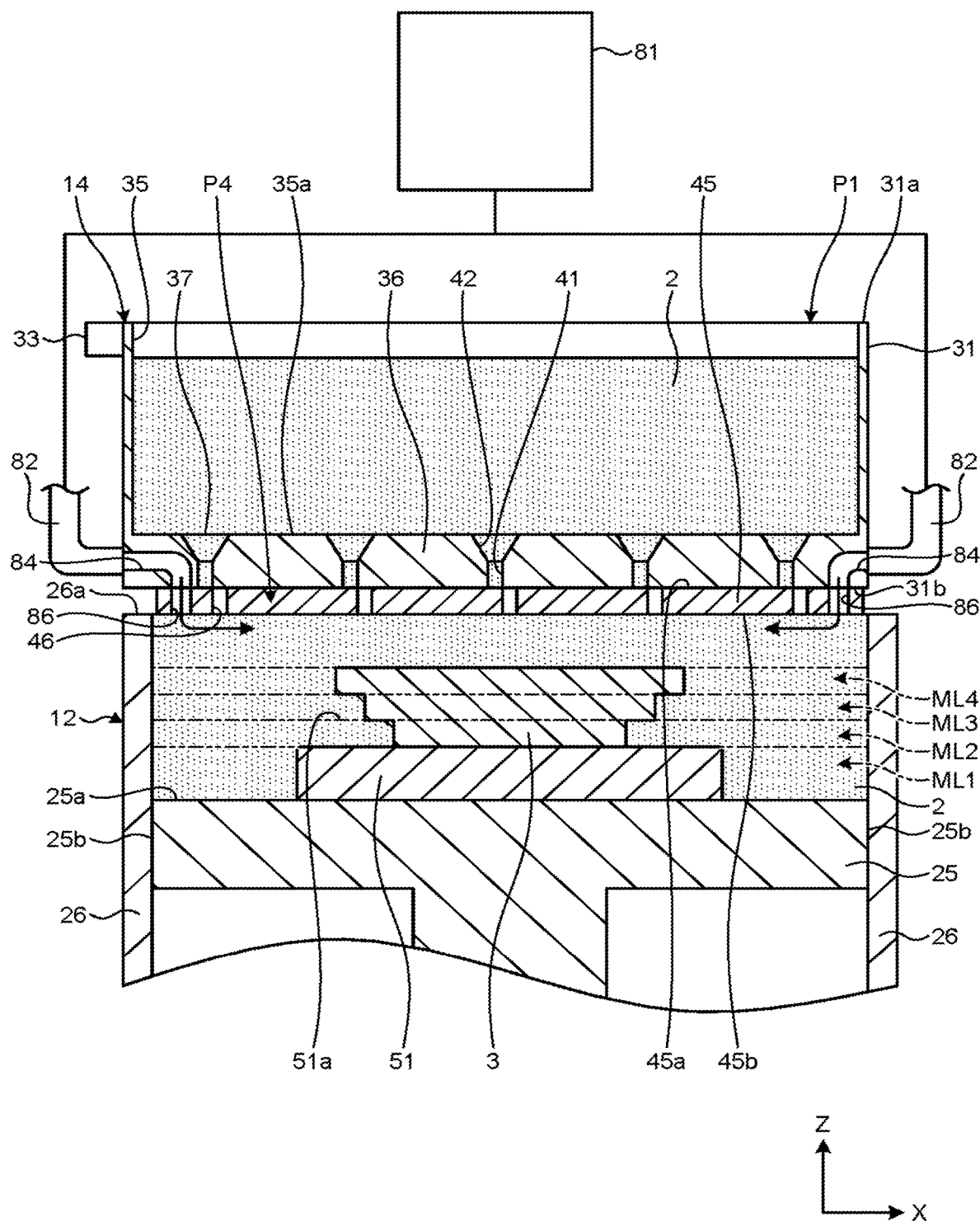
FIG. 11 is a sectional view of the stage with a material being raised and the material feeder in the fourth embodiment.

FIG. 11 is a sectional view of the part of the stage 12 with the material 2 being raised and the material feeder 14. As illustrated in FIG. 11, the air supplying device 81 sends air into the space surrounded by the circumferential wall 26 and the closure wall 45, to raise the material 2 fed to the feed region R. In other words, the material 2 flies in the air in the space surrounded by the circumferential wall 26 and the closure wall 45. The air sent into the space surrounded by the circumferential wall 26 and the closure wall 45 comes out of a vent (ventilation hole) provided in the material feeder 14, for example.

When a certain time elapses after the initiation of sending air, the air supplying device 81 stops the blow. As a result, the material 2 that flies in the air falls to the feed region R. The fallen material 2 forms the substantially uniform layers ML2, ML3, ML4, . . . in the feed region R. In the present embodiment, the material 2 is stirred by the air supplying device 81, but the material 2 may be stirred by other means, such as brushes.

Figure 12:
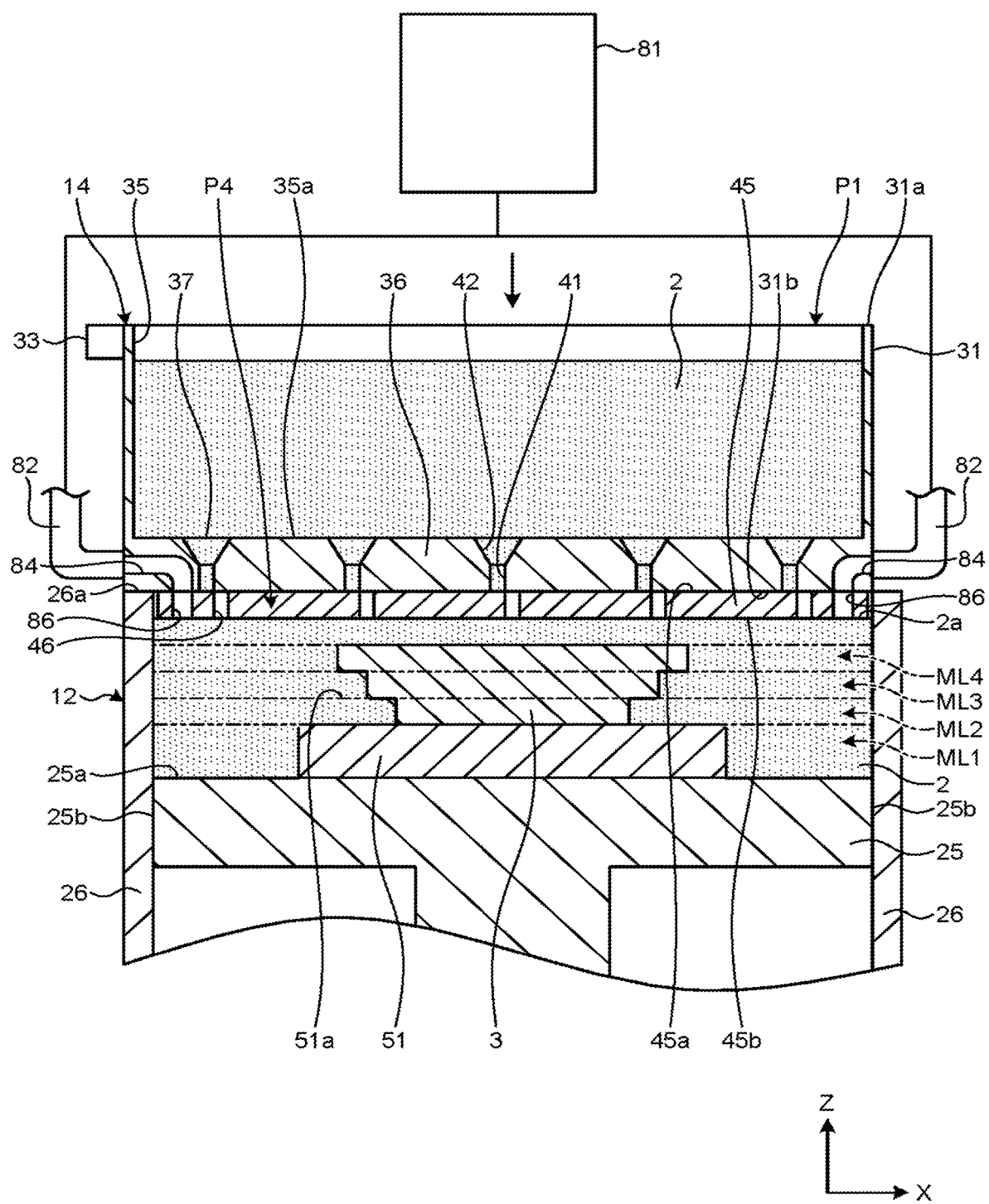
FIG. 12 is a sectional view of the stage with a material being pressed and the material feeder in the fourth embodiment.

FIG. 12 is a sectional view of the part of the stage 12 with the material 2 being pressed and the material feeder 14. As illustrated in FIG. 12, when the material 2 has been fed to the feed region R, the material feeder 14 moves towards the feed region R. The closure wall 45 enters into the circumferential wall 26 and pushes the material 2 stacked on the feed region R. This improves the density (the filling rate) of the layers ML2, ML3, ML4, . . . of the material 2.

In the three-dimensional printer 1 of the fourth embodiment, the air supplying device 81 sends air to the space surrounded by the closure wall 45 and the circumferential wall 26 to raise the material 2 fed to the feed region R. The raised material 2 falls to the feed region R to form the layers ML2, ML3, ML4, . . . , which have a substantially uniform thickness. As a result, the surface 2a of the material 2 fed to the feed region R is easily flattened.

Figure 13:
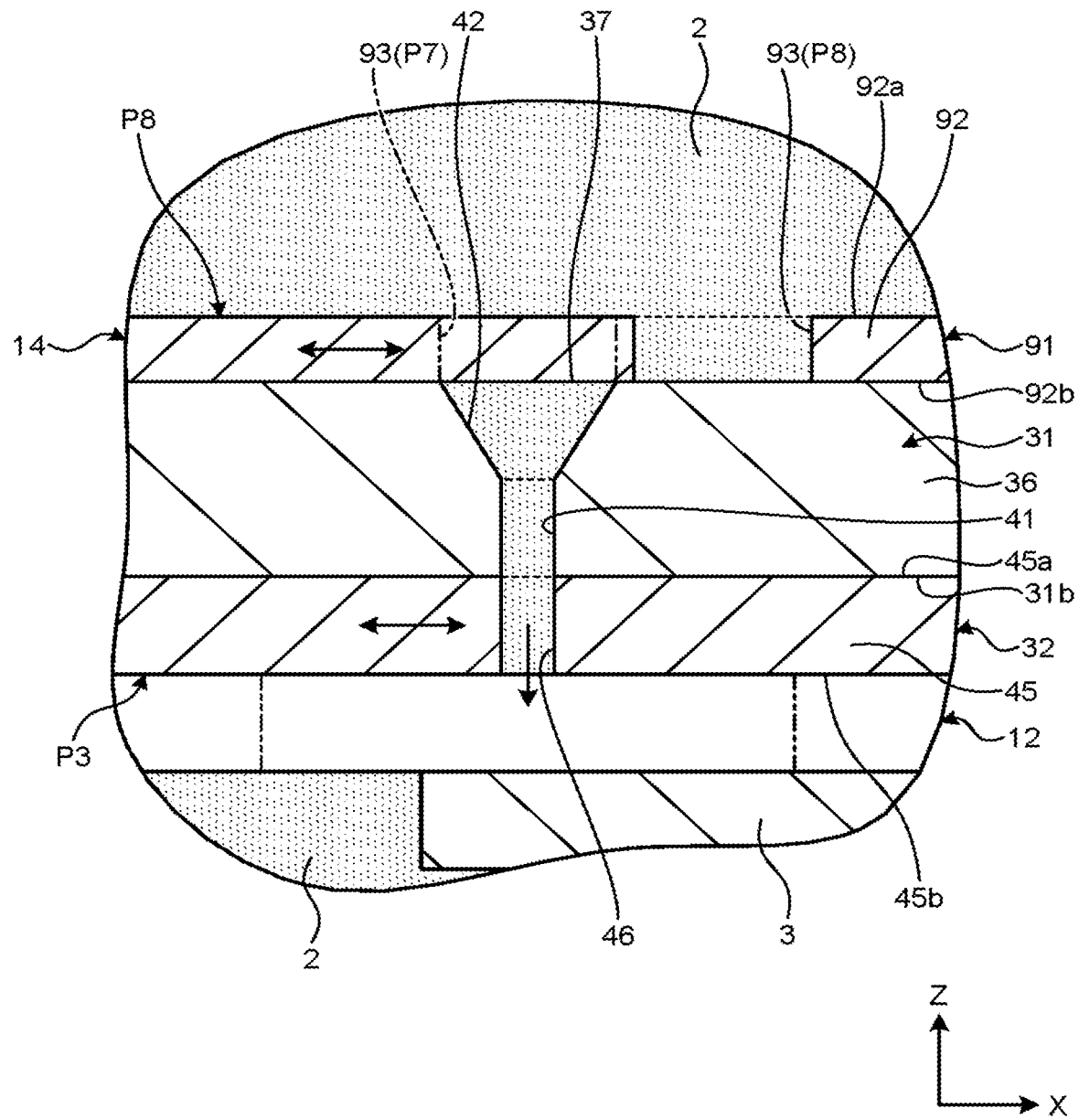
FIG. 13 is a sectional view of the stage and the material feeder according to a fifth embodiment.

Hereinafter, a fifth embodiment will be described with reference to FIG. 13. FIG. 13 is a partially sectional view of the stage 12 and the material feeder 14 according to the fifth embodiment. As illustrated in FIG. 13, the material feeder 14 of the fifth embodiment further has an internal shutter 91. The internal shutter 91 is an example of the opening-closing part.

The internal shutter 91 is placed on the bottom face 35a of the container 35. The internal shutter 91 is not limited to this example, and may be provided within the bottom wall 36, for example. The internal shutter 91 is provided with an upper closure wall 92 and a plurality of upper communicating holes 93.

The upper closure wall 92 is a substantially quadrangular plate-like member that covers the bottom face 35a of the container 35. The shape of the upper closure wall 92 is not limited to this example. The upper closure wall 92 has an upper face 92a and a lower face 92b. The upper face 92a supports the material 2 contained in the container 35. The lower face 92b is located on the opposite side of the upper face 92a and is in contact with the bottom face 35a of the container 35.

The upper communicating holes 93 are each provided in the upper closure wall 92. Each upper communicating hole 93 is a circular hole provided from the upper face 92a of the upper closure wall 92 to the lower face 92b thereof. The diameter of the upper communicating hole 93 is substantially equal to the diameter of the opening part (the upper end of the introducing part 42) of the introducing part 42, the opening part provided in the bottom face 35a of the container 35. The shape and diameter of the upper communicating hole 93 are not limited to these examples.

The upper communicating holes 93 are arranged at a substantially uniform interval in the direction along the X-axis and the direction along the Y-axis, similarly to the feed ports 37. The distance (pitch) between one upper communicating hole 93 and another one next to the upper communicating hole 93 is 1 mm, for example, similarly to the interval of the feed ports 37. That is to say, the upper communicating holes 93 are arranged in the same manner as the feed ports 37 and at the same interval as the feed ports 37.

The upper closure wall 92 can move, for example, in the direction along the X-axis, with various devices including an actuator. The movement direction of the upper closure wall 92 is not limited to this example. The upper closure wall 92 moves between an opening position P7 and a closing position P8, for example. FIG. 13 illustrates the upper closure wall 92 at the closing position P8.

FIG. 13 illustrates the upper closure holes 93 with the upper closure wall 92 being at the closing position P7, in a two-dot chain line. When the upper closure wall 92 is located at the opening position P7, the upper communicating holes 93 each communicate with the introducing parts 42 of the feed ports 37. That is to say, the introducing parts 42 are each opened by the corresponding upper communicating holes 93.

When the upper closure wall 92 is located at the closing position P8, the positions of the upper communicating holes 93 are shifted from the corresponding introducing parts 42 of the feed ports 37. Thus, the upper closure wall 92 at the closing position P8 closes the introducing parts 42 of the feed ports 37.

The material feeder 14 of the fifth embodiment described above moves the upper closure wall 92 to the opening position P7 when the closure wall 45 is at the closing position P4. As a result, the feed ports 37 are each filled with the material 2 in the container 35. The material 2 with which the feed ports 37 are filled is supported by the closure wall 45 at the closing position P4. The volume of each feed port 37 is equal to the volume of the corresponding divided section RD to which the feed port 37 supplies the material 2.

When the feed ports 37 has been filled with the material 2, the upper closure wall 92 is moved to the closing position P8. As a result, in each feed port 37, the material 2 fed to the corresponding divided section RD in a formation of one of the layers ML2, ML3, ML4, . . . of the material 2 is held.

The material feeder 14 at the feed position P1 moves the closure wall 45 to the opening position P3. As a result, the feed ports 37 are opened and the material 2 held in each feed port 37 is fed from each feed port 37 to the feed region R. At this time, the upper closure wall 92 prevents the material 2 contained in the container 35 from flowing into the feed ports 37. Each feed port 37 feeds the holding material 2 to the corresponding divided section RD, so that the layers ML2, ML3, ML4, . . . of the material 2 is formed in the feed region R and each feed port 37 empties.

In the three-dimensional printer 1 of the fifth embodiment, each feed port 37 holds a certain amount of the material 2. This causes the amount of the material 2 fed to the feed region R to be constant.

According to at least one embodiment described above, a feeding unit feeds a material from a plurality of first openings provided in a first wall to a region in parallel to form a layer of the material in the region. This shortens the distance by which the feeding unit moves above the region, and reduces feeding time of the powdery material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in a the form of the embodiments described herein may be made without departing from the spirit of the inventions. The accompanying claims and their equivalents are intended to cover such forms or modifications as would fall within the scope and spirit of the inventions.

For example, in the above embodiments, the three-dimensional printer 1 melts the material 2 with the laser beam L to form the manufactured object 3. However, the three-dimensional printer 1 is not limited to this example, and may feed, for example, a bonding agent (a binder) to the material 2 with an ink jet and other devices, to solidify the material 2 partially to form the manufactured object 3. In this case, the material 2 is not limited to a metal, and may be other materials, such as a resin.

Furthermore, in the above embodiment, the three-dimensional printer 1 uses the laser beam L as an energy ray for melting the material 2. However, an energy ray may be, as far as melting the material similarly to the laser beam L, for example, an electron beam and an electromagnetic wave from a microwave region to an ultraviolet region.

The invention claimed is:

1. A material feeder of an additive manufacturing apparatus, the material feeder comprising:
a feeder comprising:
a container that is containable of a powdery material;
a first wall that is provided with a plurality of first openings configured to be communicated with the container and that is configured to at least partially cover a region to which the material is fed;
an opening-closing part that is configured to open and close the first openings; and
a surface that faces the region,
the feeder configured to feed the material in the container from the first openings to the region to form a layer of the material and configured to slide the surface on the layer of the material to level the layer of the material, wherein
the opening-closing part comprises a plurality of valve parts that are each provided in correspondence to the first openings and are configured to move in a direction intersecting the first wall to open and close the first openings.

2. The material feeder of an additive manufacturing apparatus according to claim 1, wherein the feeder is configured to cause the material to fall from the first openings to feed the material to the region.

3. The material feeder of an additive manufacturing apparatus according to claim 2, further comprising: a vibrator configured to vibrate the feeder.

4. The material feeder of an additive manufacturing apparatus according to claim 1, wherein the first openings are placed in a form of grid points.

5. The material feeder of an additive manufacturing apparatus according to claim 1, wherein the first openings each extend in a first direction and are arranged in a second direction intersecting the first direction.

6. The material feeder of an additive manufacturing apparatus according to claim 1, wherein the opening-closing part comprises a movable part that is provided with a plurality of second openings that are able to communicate with the respective first openings, and is movable along the first wall between a first position in which the movable part closes the first openings and a second position in which the first openings each communicate with the second openings.

7. The material feeder of an additive manufacturing apparatus according to claim 1, wherein the opening-closing part comprises a valve member that is configured to be provided in the container and comprises the plurality of valve parts.

* * * * *